Figure 1:
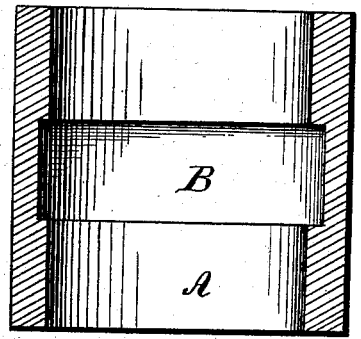

(No Model.)

J. O. MORSE.
WROUGHT IRON COUPLING FOR PIPE SECTIONS.

No. 263,943. Patented Sept. 5, 1882.

Witnesses:
R. D. Gaylord
Robt. H. Duncan

Inventor:
James O. Morse

UNITED STATES PATENT OFFICE.

JAMES O. MORSE, OF ENGLEWOOD, NEW JERSEY.

WROUGHT-IRON COUPLING FOR PIPE-SECTIONS.

SPECIFICATION forming part of Letters Patent No. 263,943, dated September 5, 1882.

Application filed February 21, 1882. (No model.)

*To all whom it may concern:*

Be it known that I, JAMES O. MORSE, of Englewood, in the county of Bergen and State of New Jersey, have invented certain new and useful Improvements in Wrought-Iron Couplings for Pipe-Sections, of which the following is a specification.

It is important in forming tight and stiff screw-joints between sections of wrought-iron pipe united by wrought-iron coupling-rings that the male screws on the ends of the pipe-sections and the female screws within the coupling-ring be of a true and corresponding taper, so that when these parts are screwed home the diameter of the male and female screws at any corresponding point of their length will be substantially the same, and consequently the threads of the screws will be in intimate contact with each other throughout their entire length, and will contribute to the tightness, strength, and stiffness of the joint.

Heretofore it has been the ordinary practice to construct wrought-iron coupling-rings with female screws whose threads upon the opposite sides of the wall of the coupling were parallel, thus producing a bore of uniform diameter throughout the entire length of the ring, and as the male screws upon the ends of the pipe-sections must be tapering the result was a failure to produce the tight, stiff, and strong joint required for many purposes. Attempts have been made to increase the efficiency of such joints by applying great force in screwing the end of the pipe into the coupling, whereby the female screw has become expanded and slightly tapered, and thus made to correspond, in a measure, to the shape of the male screw; but this stretching of the ring not only can never produce a perfect fit of the parts, but also tends to weaken the coupling.

The recent application of wrought-iron pipe to long lines under great pressure, and to deep oil-wells requiring perfect tightness and great stiffness under vibration, has led to the construction of wrought-iron couplings with female screws at each end of the coupling of a taper to correspond accurately to the true taper of the male screws. This coupling as heretofore constructed has been made by first tapping out a parallel screw-thread extending the entire length of the coupling and then tapping out a tapering thread extending from each end toward the center of the coupling. Inasmuch as it is necessary to first cut parallel threads of the same size as the tapering threads and through the entire length of the coupling, it is apparent that the making of couplings in this way involves the expenditure of great power and wear and tear of the cutting-tools. The coupling made in this way is also liable to be imperfect from the weakening of the thread at the junction of the tapering with the parallel thread by the cross-cut of the tap.

It is the object of the present invention to produce wrought-iron coupling-rings provided with screw-threads having a true taper from each end of the ring toward the center thereof.

Figure 2:
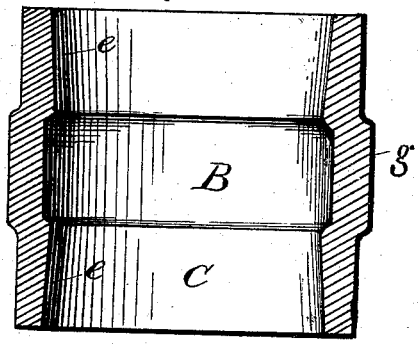
Figure 3:
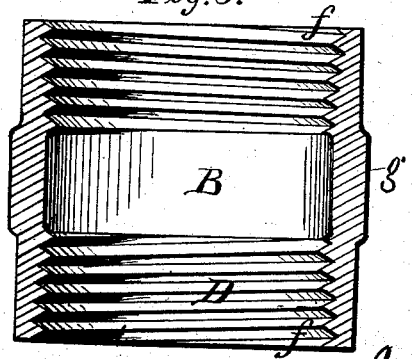

The invention is illustrated in the accompanying drawings, in which Figure 1 is a sectional view of a plain ring or blank of wrought-iron with a central groove or recess extending around its interior wall. Fig. 2 is a plain ring or blank with interior-tapered ends, and with the central groove or recess formed by expanding the metal; and Fig. 3 is a sectional view of a completed coupling-ring with tapered screw-threads extending from each of its ends to the edges of the central groove or recess.

In the drawings, A represents a ring or blank of wrought-iron with a central groove or recess, B, extending around the interior.

C represents a blank or ring whose ends *e e* are brought to the desired taper for the screw-threads by reaming out the metal or otherwise.

D represents a completed coupling-ring with tapered screw-threads *f f* extending from its ends to the edges of the groove or recess B.

The ring A may be formed up from a strip or bar of wrought-iron of the required width and thickness in the ordinary way by welding its ends together and bringing it into cylindrical form. The groove or recess B is then reamed or cut out by properly-constructed tools to a depth substantially equal to or a little exceeding that of the final tapered threads of the coupling, and of a width sufficient to permit the cutting of the tapered threads upon either side of the groove without interfering with the metal upon the other side thereof. The tapered threads *f f* are then cut upon the two ends of the ring A by the use of tapered screw-taps, the groove B permitting the tap to work into the coupling sufficiently far to cut the thread to the required depth from the end of the coupling to the wall of the groove.

Instead of forming the groove or recess B by cutting or reaming out the metal of the ring, it may be formed by expanding the metal outward by the application of well-known tools or machines for this purpose, thus forming a projection or boss, g, on the external wall of the ring, as shown in Figs. 2 and 3; or the groove or recess B may be rolled or otherwise formed in the strip or bar of iron before it is shaped up into the ring, and its depth and outline retained by welding the ring upon a properly-constructed anvil.

In making coupling-rings of large diameter, it facilicates the work to ream out the interior walls adjacent to the ends of the ring to substantially their final taper or incline before cutting or tapping out the threads. This step of the operation is shown in Fig. 2, the taper being represented by e e.

What is claimed as new is—

A wrought-iron coupling-ring composed of a central interior groove or recess and tapered screw-threads extending from the ends of the ring to the edges of the groove, substantially as and for the purpose described.

JAMES O. MORSE.

Witnesses:
S. SAMUEL P. BELL,
ROBT. H. DUNCAN.